(12) United States Patent
Natori et al.

(10) Patent No.: US 11,370,651 B2
(45) Date of Patent: Jun. 28, 2022

(54) HYDROGEN FILLING SYSTEM AND HYDROGEN FILLING METHOD

(71) Applicant: TATSUNO CORPORATION, Tokyo (JP)

(72) Inventors: Naoaki Natori, Tokyo (JP); Yuichi Yoshida, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 16/734,843

(22) Filed: Jan. 6, 2020

(65) Prior Publication Data

US 2020/0223684 A1 Jul. 16, 2020

(51) Int. Cl.
*B67D 7/32* (2010.01)
*B67D 7/04* (2010.01)
*F17C 13/02* (2006.01)

(52) U.S. Cl.
CPC .............. *B67D 7/3245* (2013.01); *B67D 7/04* (2013.01); *F17C 13/025* (2013.01);
(Continued)

(58) Field of Classification Search
CPC ......... B67D 7/3245; B67D 7/04; Y02E 60/32; F16K 37/005; B60S 5/02; F17C 2250/0636; F17C 2250/07; F17C 2260/042; F17C 2260/024; F17C 2270/0184; F17C 2270/0168; F17C 5/06; F17C 2250/03; F17C 2270/0178; F17C 13/025;
(Continued)

(56) References Cited

U.S. PATENT DOCUMENTS

| 8,973,623 | B2* | 3/2015 | Mori | F17C 13/026 141/95 |
| 9,917,313 | B2* | 3/2018 | Kato | B60L 58/31 |
| 10,396,832 | B2* | 8/2019 | Emori | H04B 1/02 |
| 2012/0267002 | A1* | 10/2012 | Kittilsen | F17C 5/06 141/4 |
| 2013/0008533 | A1* | 1/2013 | Kato | H01M 8/04664 137/551 |

(Continued)

FOREIGN PATENT DOCUMENTS

| JP | 2016008686 A | * | 1/2016 |
| JP | 2019002515 A | | 1/2019 |

OTHER PUBLICATIONS

JP-2016008686-A English Translation of Specification (Year: 2021).*
International Search Report and Written Opinion for EP 20151037, dated May 19, 2020.

*Primary Examiner* — Timothy P. Kelly
*Assistant Examiner* — Stephanie A Shrieves
(74) *Attorney, Agent, or Firm* — Stetina Brunda Garred & Brucker (57) ABSTRACT

To provide a hydrogen filling system and a hydrogen filling method capable of preventing hydrogen from being filled at high filling rate in the same manner as the communication filling despite a condition that pressure, temperature and so on in the in-vehicle tank are not precisely grasped. The hydrogen filling system (100) of the present invention includes a control unit (CU1, CU2, CU3) for controlling hydrogen filling, wherein the control unit has a function of judging whether or not there is an abnormality in pressure or temperature data in an in-vehicle tank (IT) at communication filling and a function of stopping the communication filling and converting to non-communication filling when there is an abnormality in the pressure or the temperature data.

13 Claims, 6 Drawing Sheets

(52) U.S. Cl.
CPC ...... *F17C 13/026* (2013.01); *F17C 2221/012* (2013.01); *F17C 2250/043* (2013.01); *F17C 2250/0439* (2013.01); *F17C 2250/072* (2013.01); *F17C 2260/022* (2013.01); *F17C 2265/065* (2013.01)

(58) Field of Classification Search
CPC .............. F17C 13/026; F17C 2221/012; F17C 2250/043; F17C 2250/0439; F17C 2250/072; F17C 2260/022; F17C 2265/065; F17C 2227/04; F17C 2250/034; F17C 2225/0123; F17C 2225/036; F17C 2223/0123; F17C 2223/036; F17C 2250/032; F17C 2250/0434
USPC ........................................................ 137/557
See application file for complete search history.

(56) References Cited

U.S. PATENT DOCUMENTS

| | | | |
|---|---|---|---|
| 2013/0244124 A1* | 9/2013 | Wake | F02D 19/025 429/414 |
| 2014/0216599 A1* | 8/2014 | Loewenthal | F17C 5/00 141/4 |
| 2015/0184804 A1* | 7/2015 | Handa | F17C 13/026 141/1 |
| 2015/0362383 A1* | 12/2015 | Komiya | G01K 15/005 702/99 |
| 2016/0305611 A1* | 10/2016 | Handa | F17C 13/023 |
| 2017/0074707 A1* | 3/2017 | Mathison | F17C 5/06 |
| 2019/0074528 A1* | 3/2019 | Mori | H01M 8/04358 |

OTHER PUBLICATIONS

* cited by examiner

HYDROGEN FILLING SYSTEM AND HYDROGEN FILLING METHOD

CROSS-REFERENCE TO RELATED APPLICATIONS

The present application claims priority to Japanese Application No. 2019-004878 filed on Jan. 16, 2019, the disclosure of which is incorporated herein by reference.

STATEMENT RE: FEDERALLY SPONSORED RESEARCH/DEVELOPMENT

Not Applicable

BACKGROUND

1. Technical Field of the Invention

The present invention relates to a technique for filling hydrogen to hydrogen vehicles (FCVs) and so on.

2. Description of the Related Art

In recent years, accompanied by development and spread of vehicles mounting fuel cell (fuel cell vehicles, FCVs), it has been placed high importance to increase installation places of hydrogen station as hydrogen supply facility (refer to Patent document 1, for example). In the hydrogen station is mounted a hydrogen filling device (dispenser), which fills hydrogen to an in-vehicle tank of a vehicle arriving at the hydrogen station under the condition that pressure and temperature of the tank are maintained in predetermined ranges. At that time, there are cases when so-called "communication filling", which is a filling method with communication that hydrogen is filled while sending information on the in-vehicle tank such as pressure and temperature though infrared communication on the hydrogen filling device side. The communication filling enables hydrogen filling while confirming pressure and temperature in the in-vehicle tank, which makes it possible to safely fill hydrogen even high filling rate.

Here, due to various reasons, there are cases when pressure, temperature and the like in the in-vehicle tank cannot be transmitted on the hydrogen filling device during the communication filling (under the condition that hydrogen is being filled in the in-vehicle tank). In such cases, continuing communication filling may cause an inconvenience that hydrogen is filled at high filling rate in the same manner as the communication filling despite a condition that pressure, temperature and so on in the in-vehicle tank are not precisely grasped. But, no technique for dealing with the above inconvenience has not yet been proposed.

The content of Japanese Patent Publication No. 2000-166635 gazette is incorporated herein by reference in its entirety.

BRIEF SUMMARY

The present invention has been proposed in consideration of the problems in the above prior art, and the object of the present invention is to provide a hydrogen filling system and a hydrogen filling method capable of coping with an inconvenience that hydrogen is filled at high filling rate in the same manner as the communication filling in spite of a condition that pressure, temperature and so on in the in-vehicle tank are not precisely grasped.

A hydrogen filling system (100) of the present invention is characterized by including a control unit (CU1, CU2 or CU3 for controlling hydrogen filling, sometimes comprehensively referred to as "CU"), and the control unit has a function of judging whether or not there is an abnormality in pressure or temperature data in an in-vehicle tank (IT) at communication filling and a function of stopping communication filling and converting to non-communication filling when there is an abnormality in the pressure or the temperature data.

In the present invention, the control unit (CU) preferably has functions of comparing pressure or temperature data with previous pressure or temperature data (in a previous cycle), and judging as normal when increased amount is within predetermined values (positive values δ1, δ2), and as abnormal when increased amount is larger than the predetermined value (positive value δ1, δ2), that is, the amount rapidly increases; the increased amount is zero, that is, the pressure or the temperature does not change; or the increased amount in negative, that is, the pressure or the temperature decreases.

Then, in the present invention, the control unit (CU) preferably has functions of judging whether or not, before starting communication filling, communication for transmitting data on pressure and temperature in an in-vehicle tank (IT) to a filling device (dispenser 1) is established, that is, whether or not vehicle communication is established, and selecting communication filling when the communication is established and selecting non-communication filling when the communication is not established.

A hydrogen filling method of the present invention is characterized by including a process for judging whether or not there is an abnormality in pressure or temperature data in an in-vehicle tank (IT) at communication filling and a process for stopping communication filling and converting to non-communication filling when there is an abnormality in the pressure or the temperature data.

In the method according to the present invention, preferably in the process for judging whether or not there is an abnormality, pressure or temperature data is compared with previous pressure or temperature data (in a previous cycle), and when increased amount is within a predetermined value (positive value δ1, δ2), it is judged as normal, and when increased amount is larger than the predetermined value (positive value δ1, δ2), that is, the amount rapidly increases; the increased amount is zero, that is, the pressure or the temperature does not change; or the increased amount in negative, that is, the pressure or the temperature decreases, it is judged as abnormal.

Then, the method of the present invention preferably has processes for judging whether or not, before starting communication filling, communication for transmitting data on pressure and temperature in an in-vehicle tank (IT) to a filling device (dispenser 1) is established, that is, whether or not vehicle communication is established, and selecting communication filling when the communication is established and selecting non-communication filling when the communication is not established.

Here, in the communication filling, information on the pressure and temperature in the in-vehicle tank (IT) is transmitted toward the hydrogen filling device (1) through infrared communication. However, it is not limited to the infrared communication, but it is possible to transmit the pressure and temperature in the in-vehicle tank (IT) toward the hydrogen filling device (1) by using radio wave in a bandwidth that is used in an electronic toll collection system (ETC) for instance. In addition, the fuel cell vehicle is not limited to a passenger vehicle. The words "fuel cell vehicle" or "FCV" is not used for a passenger vehicle only but is for a vehicle including a truck, a bus, a forklift and a two-wheeled vehicle. In other words, the fuel cell vehicle (FCV) in the present specification is defined to be all machines with a fuel cell and capable of moving with people.

With the present invention having the above construction, in communication filling, when there is an abnormality in measurement value of pressure or temperature in an in-vehicle tank (IT), communication filling is converted to non-communication filling. When there is an abnormality in measurement value of pressure or temperature in an in-vehicle tank (IT), it can be judged to be a state where pressure or temperature in an in-vehicle tank cannot be transmitted accurately on a hydrogen filling device side. Then, in case of non-communication filling, filling rate is set to be lower than that of communication filling, so that converting to the non-communication filling allows hydrogen filling to be performed at low filling rate, that is, on the safe side, which prevents hydrogen being filled up to the limit of the in-vehicle tank (IT), that is, full tank. In other words, when there is a fear that pressure or temperature in an in-vehicle tank (IT) is not accurately transmitted on the hydrogen filling device (1) side in communication filling, it is converted to non-communication filling, which is more space to spare on the in-vehicle tank (IT) side, that is, to a safety side, in such a case, hydrogen filling can be carried out in safety.

DETAILED DESCRIPTION

Figure 1:
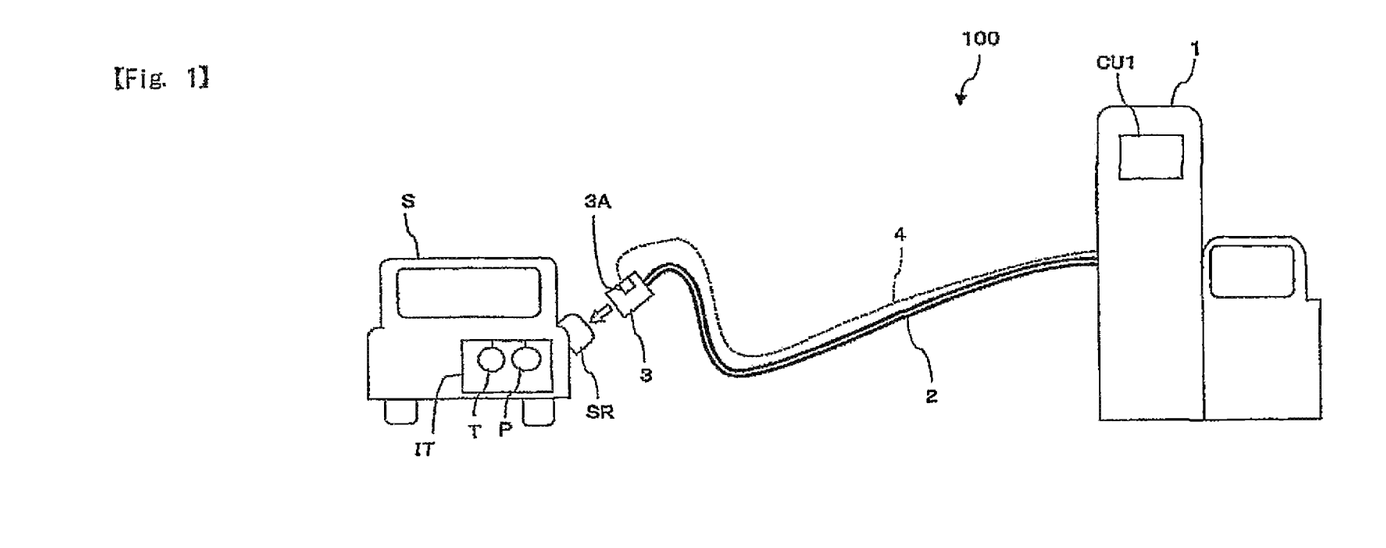
FIG. 1 is an explanation drawing of a hydrogen filling system according to the first embodiment of the preset invention.

Next, embodiments of the present invention will be explained with reference to the drawings. At first, the first embodiment of the present invention will be explained with reference to FIGS. 1 to 5. In FIG. 1, a hydrogen filling system of the present invention whose overall construction is indicated with numeral 100 includes a hydrogen filling device 1 and a control unit CU1 for controlling hydrogen filling, and the control unit CU1 is installed in the hydrogen filling device 1. To the hydrogen filling device 1 is connected a filling hose 2, and to an end of the filling hose 2 is attached a filling nozzle 3. The filling nozzle 3 is connectable and disconnectable to a receptacle SR on an in-vehicle tank IT (fuel tank) of a vehicle S to which hydrogen is filled (for instance, a fuel cell vehicle FCV). In addition, the hydrogen filling device 1 includes a signal transmitting system 4 for transmitting information on the in-vehicle tank of the S such as pressure and temperature data. The signal transmitting system 4 connects the hydrogen filling device 1 and an optical communication receiver 3A mounted to the filling nozzle 3 with each other.

During hydrogen filling, hydrogen is filled from the hydrogen filling device 1 through the filling hose 2 and the filling nozzle 3 to the in-vehicle tank of the S. In case of communication filling, during filling operation, information on inside of the in-vehicle tank IT such as temperature and pressure are detected by a pressure sensor P, a temperature sensor T and so on, and they are transmitted to the control unit CU1 mounted to the hydrogen filling device 1 from an optical communication transmitter not shown on the vehicle side, which is built in the receptacle SR through the optical communication receiver 3A for optical communication, which is built in the filling nozzle 3, and the signal transmitting system 4. The control unit CU1 controls communication filling from the hydrogen filling device 1 to the inside of the in-vehicle tank IT based on the information on the inside of the in-vehicle tank IT, which is transmitted through the signal transmitting system 4, such as temperature and pressure. However, the communication from the in-vehicle tank IT to the hydrogen filling device 1 is not limited to optical communication but it is possible to use radio wave in a bandwidth that is used in an electronic toll collection system (ETC) for instance. Here in the hydrogen filling device 1 (hydrogen filling system 100), in place of the communication filling, non-communication filling can be used.

The control unit CU1 has functions of acquiring, in addition to the information on the inside of the in-vehicle tank IT such as temperature and pressure, inspection code for detecting appropriateness of the communication from the vehicle S side and judging whether or not vehicle communication is established. In addition, the control unit CU1 has a function of judging, during communication filling, the communication filling should be continued or stopped to convert to non-communication filling. In case of non-communication filling in which information on the in-vehicle tank IT of the vehicle S such as pressure and temperature are not transmitted to the hydrogen filling device 1, in comparison to communication filling, hydrogen filling rate in the in-vehicle tank IT is set to be low. This is because, in case of non-communication filling, hydrogen is filled under the condition that status such as pressure and temperature in the in-vehicle tank IT of the vehicle S to which hydrogen is filled is not unknown, it is more dangerous in comparison to communication filling, so that hydrogen is filled in a less dangerous way (in a safer direction). In this connection, in case of non-communication filling, hydrogen is not filled up to the limit of the in-vehicle tank IT with high pressure, that is, full tank. The control unit CU1 according to the first embodiment will be explained with reference to FIGS. 2 to 5.

Figure 2:
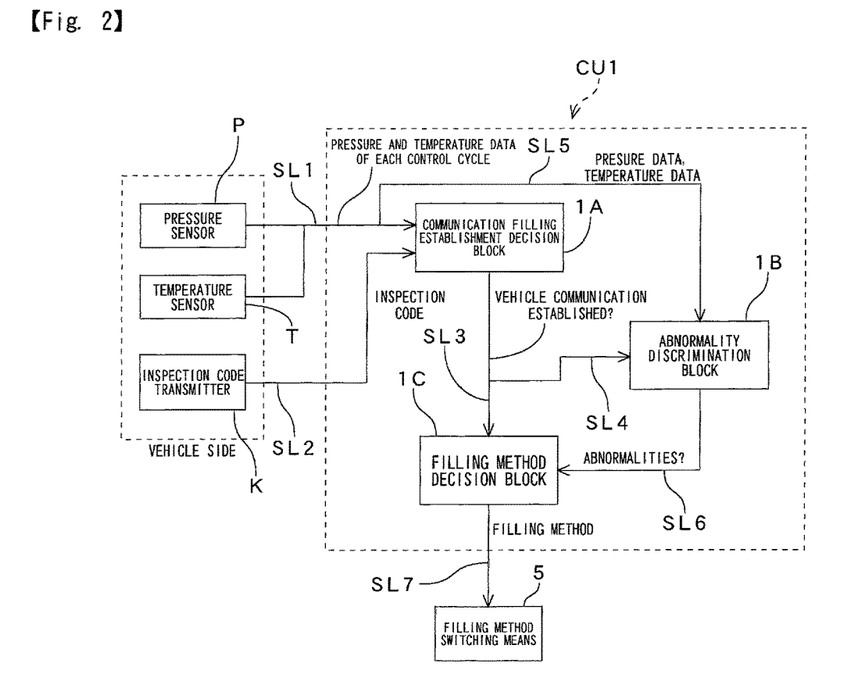
FIG. 2 is a functional block diagram of a control unit of the system according to the first embodiment.

In FIG. 2 showing functional blocks of the control unit CU1, the control unit CU1 includes a communication filling establishment decision block 1A, an abnormality decision block 1B and a filling method decision block 1C. The communication filling establishment decision block 1A acquires, before starting hydrogen filling, from the pressure sensor P, temperature sensor T and others in the in-vehicle tank IT (refer to FIG. 1) of the vehicle S, pressure data, temperature data and so on for each control cycle through the signal line SL1 and acquires inspection code from the inspection code transmitter K of the vehicle through signal line SL2. The communication filling establishment decision block 1A has a function of judging, based on the acquired inspection data, pressure data, temperature data and so on, whether or not communication of transmitting data such as pressure and temperature on the vehicle S side (in the in-vehicle tank IT), that is, vehicle communication, is established. Here, that the vehicle communication is established is a precondition for communication filling.

The result of the judgement by the communication filling establishment decision block 1A, that is, whether vehicle communication is established or not, is transmitted to the filling method decision block 1C through the signal line SL3, and to the abnormality discrimination block 1B through the signal line SL4. Meanwhile, it is conventionally performed to judge establishment of the vehicle communication (or soundness of communication itself) by checking whether or not data transmitted from a vehicle side such as pressure and temperature are valid.

In the judgement whether or not vehicle communication is established, when valid data are continuously received from the vehicle S side (the pressure sensor P, the temperature sensor T in the in-vehicle tank IT) over predetermined intervals (for example 500 msec), it is judged to be "vehicle communication is established". In other words, even when invalid data are temporarily sent from the vehicle S side (the pressure sensor P, the temperature sensor T in the in-vehicle tank IT) at a predetermined interval (for example 500 msec), it is not immediately judged to be "vehicle communication is not established". On the other hand, when invalid data are continuously sent from the vehicle S side over predetermined intervals (for example 500 msec) or signals from the vehicle S are stopped, it is judged to be "vehicle communication is not established".

The abnormality discrimination block 1B has functions of acquiring, during communication filling, from the pressure sensor P, temperature sensor T and others in the in-vehicle tank IT, pressure data, temperature data and so on through the signal line SL5 and acquiring the judgement result, that is, whether vehicle communication is established or not through the signal line SL4. Further, the abnormality discrimination block 1B has a function of judging whether or not the obtained pressure data, temperature data and so on are abnormal. Standard of abnormality judgment and work procedure in the abnormality discrimination block 1B are explained with reference to FIGS. 3 and 5 in detail. The result of judgement (whether or not the obtained pressure data, temperature data and so on are abnormal) is transmitted to the filling method decision block 1C through the signal line SL6.

The filling method decision block 1C has functions of acquiring judgment result (whether or not vehicle communication is established) of the communication filling establishment decision block 1A through the signal line SL3 and determining communication filling or non-communication filling. The filling method decision block 1C selects communication filling when vehicle communication is established before filling starts, and selects non-communication filling when vehicle communication is not established. In addition, the filling method decision block 1C has a function of acquiring judgement result (whether or not there is an abnormality in pressure data, temperature data and so on during communication filling) through the signal line SL6. Then, the filling method decision block 1C has a function of determining whether communication filling as a filling method is continuously performed or the communication filling is stopped to convert to non-communication filling. The filling method decision block 1C selects continuously performing communication filling when there is no abnormality in pressure data, temperature data and so on during communication filling, and selects stopping the communication filling and converting to non-communication filling when there is an abnormality in pressure data, temperature data and so on.

The judgement result of the filling method decision block 1C is transmitted to a filling method switching means 5 of the hydrogen filling device 1 through the signal line SL7. The filling method switching means 5 selects, based on the determination result of the filling method decision block 1C, filling method. Then, communication filling or non-communication filling is selected, or communication filling is stopped and converted to non-communication filling. Here, operation of converting communication filling to non-communication filling can be carried out by processing with software.

Figure 3:
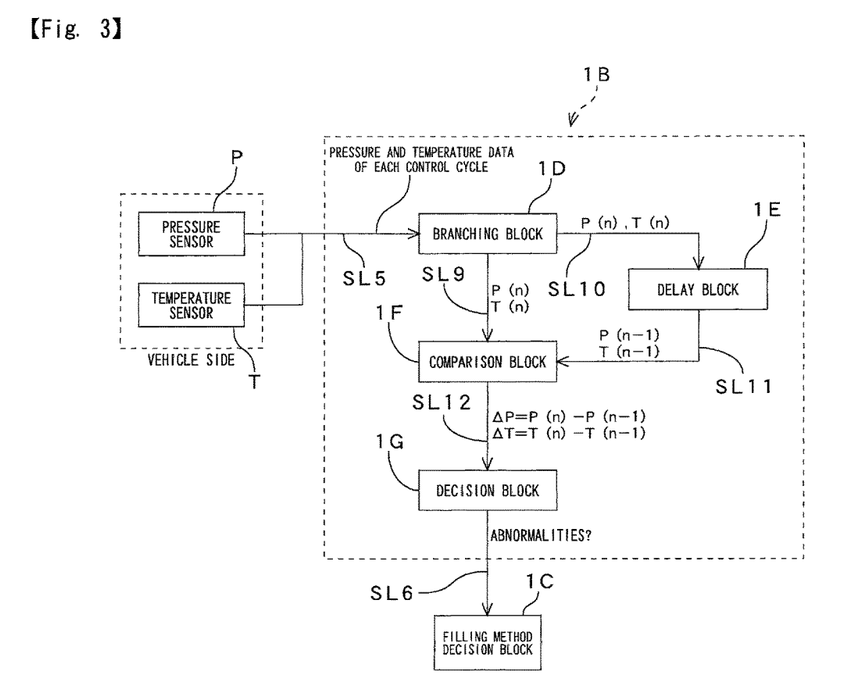
FIG. 3 is a functional block diagram of an abnormality discrimination block shown in FIG. 2.

In FIG. 3 showing each functional block in the abnormality discrimination block 1B shown in FIG. 2 in detail, the abnormality discrimination block 1B includes a branching block 1D, a delay block 1E, a comparison block 1F and a decision block 1G. The branching block 1D has functions of acquiring, from the pressure sensor P, temperature sensor T and others in the in-vehicle tank IT, pressure data, temperature data and so on for each control cycle during communication filling through the signal line SL5 and transmitting the acquired pressure data, temperature data and so on for each control cycle to the comparison block 1F though the signal line SL9. Further, the branching block 1D has a function of transmitting the pressure data, the temperature data and so on for each control cycle to the delay block 1E through the signal line SL10.

The delay block 1E has functions of delaying pressure data, temperature data and others obtained from the branching block 1D for each operation cycle by one operation cycle, and transmitting the delayed data to the comparison block 1F through the signal line SL11. Here, among the pressure data, temperature data and so on that are transmitted from the delay block 1E to the comparison block 1F, the pressure data and temperature data that are transmitted from the branching block 1D to the comparison block 1F and the delay block 1E are indicated to be symbols P(n) and T(n). Then, pressure data and temperature data that are delayed by one control cycle against the pressure data P(n) and the temperature data T(n) by the delay block 1E are indicated to be P(n−1) and T(n−1) respectively. For example, data transmitted from the branching block 1D to the comparison block 1F and the delay block 1E are P(n) and T(n), and data transmitted from the delay block 1E to the comparison block 1F and before the P(n) and the T(n) by one control cycle are P(n−1) and T(n−1).

The comparison block 1F has functions of comparing pressure data P(n) and temperature data T(n) obtained from the branching block 1D and pressure data P(n−1) and temperature data T(n−1) obtained from the delay block 1E with each other, and calculating their differences ΔP and ΔT. Here, the differences ΔP and ΔT are shown with the following formulas.

$$\Delta P = P(n) - P(n-1), \Delta T = T(n) - T(n-1)$$

Results of the comparison by the comparison block 1F, that is, the differences ΔP and ΔT are sent to the decision block 1G through the signal line SL12.

The decision block 1G has a function of judging whether there is an abnormality in pressure or temperature data in the in-vehicle tank IT at communication filling based on the comparison result (the differences ΔP,ΔT). In the judgement, the decision block 1G judges a condition that pressure and temperature data in the in-vehicle tank IT at communication filling gradually increase as normal. Specifically, comparing the pressure and temperature data P(n) and T(n) with precedent (one control cycle before) pressure and temperature data P(n−1) and T(n−1), the decision block 1G judges that it is normal when increased amounts are within predetermined values δ1, δ2 (δ1, δ2 are positive values). Conditions that the decision block 1G judges as normal are shown below.

$$0 < \Delta P = P(n) - P(n-1) \leq \delta 1 \text{ and } 0 < \Delta T = T(n) - T(n-1) \leq \delta 2$$

On the other hand, comparing the pressure and temperature data P(n) and T(n) with precedent (one control cycle before) pressure and temperature data P(n−1) and T(n−1), the decision block 1G judges that it is abnormal when increased amounts are larger than predetermined values δ1, δ2 (rapidly increased) or the increased amounts are negative values (pressure or temperature is decreased). Conditions that the decision block 1G judges as abnormal are shown below.

$$\Delta P = P(n) - P(n-1) > \delta 1 \text{ or } \Delta P = P(n) - P(n-1) \leq 0$$

$$\Delta T = T(n) - T(n-1) > \delta 2 \text{ or } \Delta T = T(n) - T(n-1) \leq 0$$

The judgement result of the decision block 1G (whether or not there is an abnormality in pressure or temperature data) is transmitted to the filling method decision block 1C (refer to FIG. 2) through the signal line SL6. The judgement whether or not there is an abnormality in pressure or temperature data by the decision block 1G is carried out at different intervals from those (for instance 500 msec) in the judgement of vehicle communication establishment. For example, when pressure, temperature or the like is abnormal over longer intervals than the intervals (for instance 500 msec) in the judgement of vehicle communication establishment, it is judged as abnormal. Here, in case that control cycle is 100 msec, when five consecutive abnormalities of pressure, temperature or the like occur for instance, it is judged as abnormal. However, the five times (or 500 msec) is mere example, the times may not be five (the predetermined interval may not be 500 msec).

Figure 4:
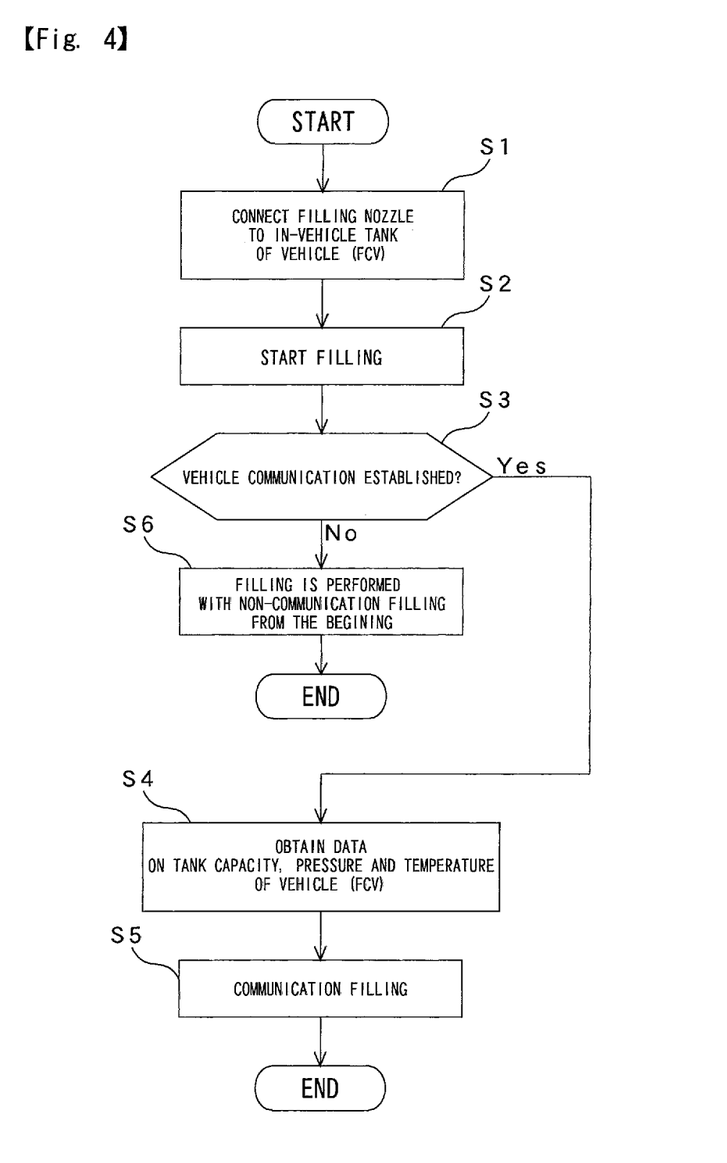
FIG. 4 is a flowchart showing a control for determining filling method before filling in the first embodiment.

Next, in the first embodiment, control in initial stage of hydrogen filling will be explained mainly with reference to FIG. 4. In FIG. 4, in Step S1, the filling nozzle 3 (refer to FIG. 1) of the hydrogen filling device 1 is connected to the receptacle SR (refer to FIG. 1) on the in-vehicle tank IT side of the vehicle S (fuel cell vehicle, FCV). Then, in Step S2, command signal for starting filling from the hydrogen filling device 1 to the in-vehicle tank IT is transmitted. With this, hydrogen is filled in the in-vehicle tank. Receiving the command signal, the communication filling establishment decision block 1A judges whether or not vehicle communication between the vehicle S (in-vehicle tank IT) and the hydrogen filling device 1 is established (Step S3). In Step S3, in case that the vehicle communication is established (Step S3; Yes), the process proceeds to Step S4, and in case that the vehicle communication is not established (Step S3; No), the process proceeds to Step S6.

In Step S4 (vehicle communication is established), the filling method decision block 1C determines that communication filling is performed. Then, data on the capacity of the in-vehicle tank IT is obtained from the vehicle S side, and pressure data, temperature data and so on in the in-vehicle tank IT are acquired to carry out communication filling (Step S5). On the other hand, in Step S6 (vehicle communication is not established), the filling method decision block 1C determines that non-communication filling is performed. Then, non-communication filling is carried out when hydrogen filling is started.

Figure 5:
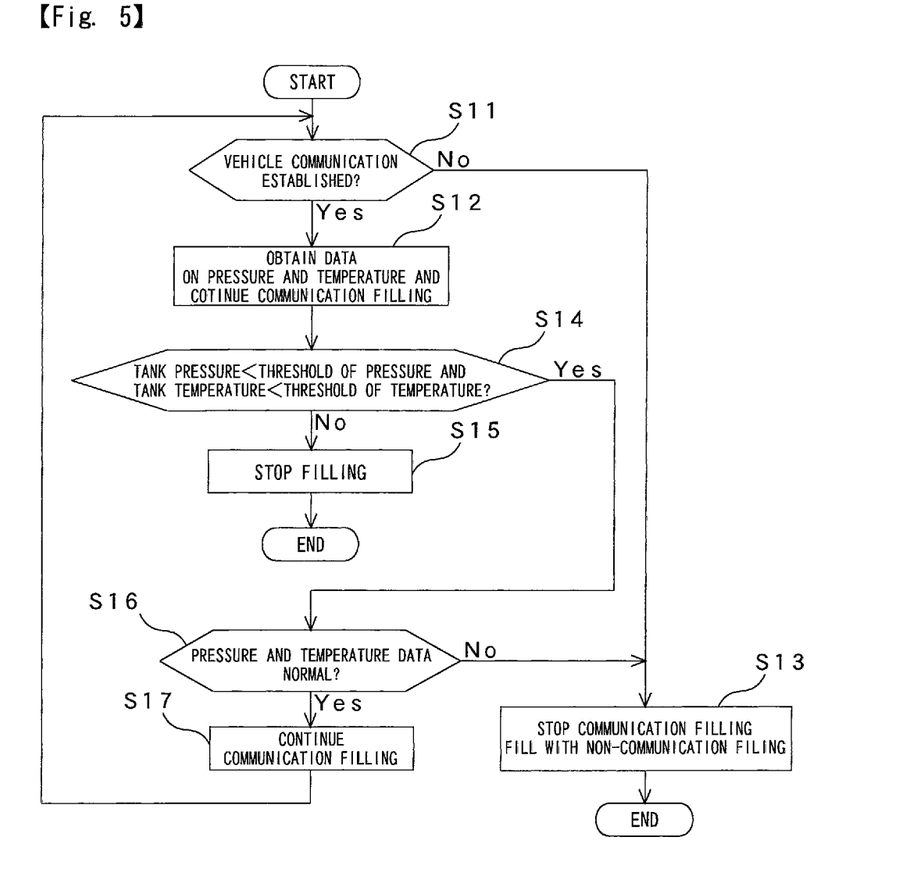
FIG. 5 is a flowchart showing a control for determining filling method during filling in the first embodiment.

Next, in the first embodiment, control for converting to non-communication filling when an abnormality is detected during communication filling will be explained mainly with reference to FIG. 5. In Step S11 in FIG. 5, it is judged whether or not vehicle communication between the vehicle S (in-vehicle tank IT) and the hydrogen filling device 1 is established. The judgement in Step S11 is also, as described above with reference to FIG. 2, carried out by the communication filling establishment decision block 1A, it is judged to be "vehicle communication is established" when valid data are continuously received from the vehicle S side (the pressure sensor P, the temperature sensor T and others in the in-vehicle tank IT) over predetermined intervals (for example 500 msec). In Step S11, in case that the vehicle communication is established (Step S11; Yes), the process proceeds to Step S12, and in case that the vehicle communication is not established (Step S11; No), the process proceeds to Step S13.

In Step S12 (vehicle communication is established), the filling method decision block 1C selects communication filling, and uninterruptedly acquires pressure data, temperature data and others in the in-vehicle tank IT to continue communication filling. Then, the process proceeds to Step S14. On the other hand, in Step S13 (vehicle communication is not established), the filling method decision block 1C selects non-communication filling, and stops communication filling to convert to non-communication filling. And, hydrogen filling by non-communication filling continues.

In Step S14 (communication filling continues), it is judged whether or not pressure data obtained from the pressure sensor P in the in-vehicle tank IT is lower than a threshold value of pressure (for example 87.5 MPa), and temperature data obtained from the temperature sensor T is lower than a threshold value of temperature (for example 85° C.). The threshold value of pressure (for example 87.5 MPa) and the threshold value of temperature (for example 85° C.) for maintaining inside of the in-vehicle tank IT safe are determined based on a standard of hydrogen filling in Japan. Meanwhile, to the judgements whether or not the pressure and the temperature are lower than the safe threshold values can be applied conventionally known technique, so that they are omitted in the functional block diagrams in FIGS. 2 and 3. On the judgement in Step S14, when the pressure in the in-vehicle tank IT is lower than the threshold value of pressure, and the temperature in the in-vehicle tank IT is lower than the threshold value of temperature (Step S14; Yes), the process proceeds to Step S16. On the other hand, when the pressure in the in-vehicle tank IT is equal to or higher than the threshold value of pressure, or the temperature in the in-vehicle tank IT is equal to or higher than the threshold value of temperature (Step S14; No), the process proceeds to Step S15. In Step S15 (in case that the pressure in the in-vehicle tank IT is equal to or higher than the threshold value of pressure or the temperature in the in-vehicle tank IT is equal to or higher than the threshold value of temperature), it is judged that safety hydrogen filling is not carried out, and the hydrogen filling is stopped.

In Step S16 (pressure in the in-vehicle tank IT is lower than the threshold value of pressure, and temperature in the in-vehicle tank IT is lower than the threshold value of temperature), it is judged whether there is an abnormality in pressure or temperature data in the in-vehicle tank IT during communication filling or not. This judgement is, as stated with reference to FIGS. 2 and 3 in detail), performed by the abnormality discrimination block 1B of control unit CU1, condition that the pressure and temperature data gradually increase is judged to be normal (no abnormality). As described above, when P(n), T(n) are pressure data and temperature data in the control cycle, P(n−1), T(n−1) are pressure data and temperature data in the precedent (one control cycle before) control cycle, and δ1, δ2 are positive values, in case that no abnormality exists in the pressure and temperature data, following formulas are established.

$$0<\Delta P=P(n)-P(n-1)\leq \delta 1 \text{ and } 0<\Delta T=T(n)-T(n-1)\leq \delta 2$$

In case that the above formulas are not established, the abnormality discrimination block 1B judges abnormality. On the judgement in Step S16, when no abnormality exists in the pressure data, the temperature data and so on in the in-vehicle tank IT (Step S16; Yes), the process proceeds to Step S17, and when an abnormality exists in the pressure data, the temperature data or others in the in-vehicle tank IT (Step S16; No), the process proceeds to Step S13.

In Step S17 (no abnormality in the pressure data, the temperature data and so on in the in-vehicle tank IT), communication filling continues, and the process returns to Step S11. On the other hand, in Step S13 (abnormality in the pressure data, the temperature data and so on in the in-vehicle tank IT), the communication filling is stopped and is converted to the non-communication filling, and hydrogen is filled with non-communication filling.

In the hydrogen filling system 100 shown in FIGS. 1 to 5 according to the first embodiment, at the communication filling, when the pressure data, the temperature data or the like in the in-vehicle tank IT rapidly increases, or an increased amount is zero or negative value, it is judged to be abnormal, and communication filling is converted to non-communication filling. Then, in the non-communication filling, filling rate is set to be lower than that of the communication filling, so that hydrogen filling is carried out safely. In addition, it is prevented that hydrogen is filled up to the limit of the in-vehicle tank IT, that is, full tank. Therefore, even when during the communication filling, a circumstance that cannot accurately transmit the pressure data, the temperature data and so on in the in-vehicle tank IT to the hydrogen filling device 1 side, the communication filling is converted to non-communication filling, in which there is some space (safer) on the in-vehicle tank IT side, hydrogen is safely filled. In addition, before the communication filling starts, in case that communication filling, which transmits the pressure data, the temperature data and so on in the in-vehicle tank IT to the hydrogen filling device 1 side, is not established, the communication filling is avoided, and non-communication filling can be selected.

Figure 6:
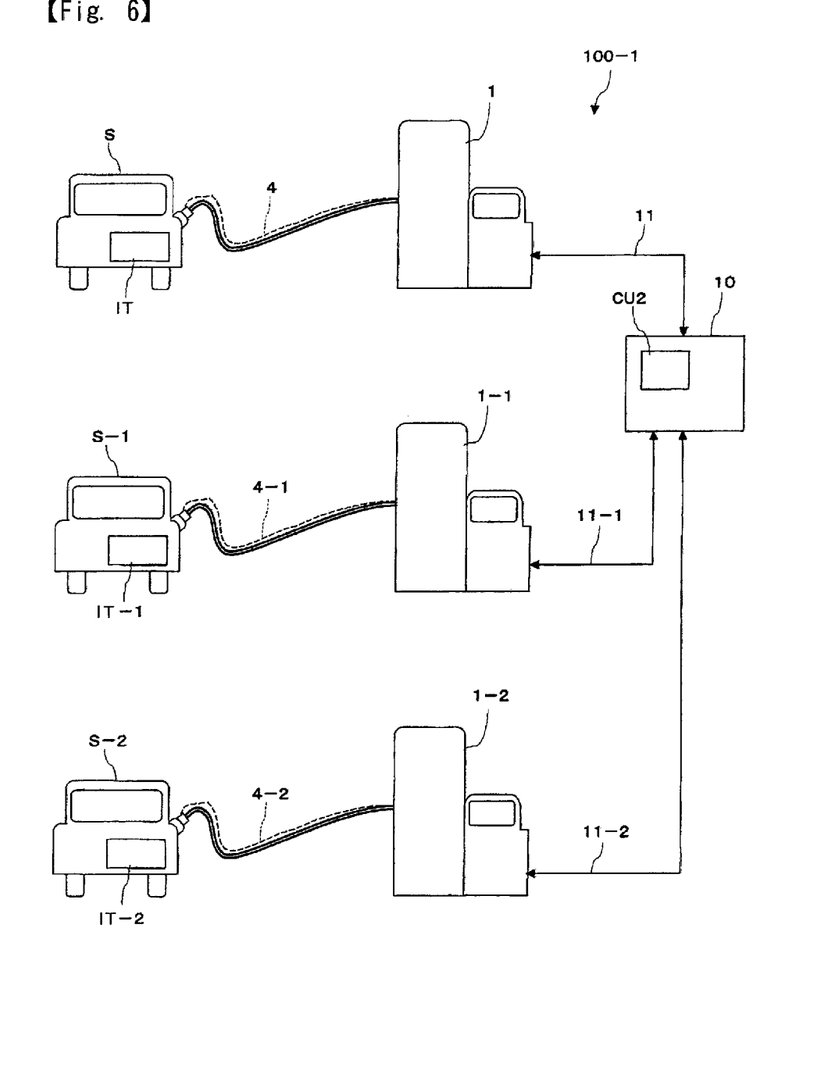
FIG. 6 is an explanation drawing of a hydrogen filling system according to the second embodiment of the preset invention.

Next, with reference to FIG. 6, the second embodiment of the present invention will be explained. In the hydrogen filling system 100-1 shown in FIG. 6, the control unit CU2 is mounted, not to each hydrogen filling device 1, but to a rear equipment 10. Here, the "rear equipment" includes so-called "POS" also in this specification. And, the rear equipment is mounted in an office for instance in a gas station. In FIG. 6, the rear equipment 10 is installed in an office of a gas station with plurality of hydrogen filling devices (dispensers) 1, and the control unit CU2 is mounted in the rear equipment 10. The control unit CU2 of the rear equipment 10 is connected to a plurality (three in FIG. 6) of hydrogen filling devices 1, 1-1, 1-2 through signal transmitting systems 11, 11-1, 11-2 capable of bidirectional communication such as optical communication path, and each hydrogen filling devices 1, 1-1, 1-2 is connectable to each in-vehicle tank IT, IT-1, IT-2 of each vehicle S, S-1, S-2 through a filling hose and a filling nozzle.

The control unit CU2 of the rear equipment 10 has the same function as the control unit CU1 of the first embodiment, and information on pressure, temperature and others of the in-vehicle-tanks IT, IT-1, IT-2 of the vehicles S, S-1, S-2 are transmitted to the control unit CU2 of the rear equipment 10 through the signal transmitting systems 4, 4-1, 4-2 on the hydrogen filling device 1 side and the signal transmitting systems 11, 11-1, 11-2 on the rear equipment 10 side. Together with the information, control signals from the control unit CU2 are sent to each hydrogen filling device 1, 1-1, 1-2. With this, communication filling can be performed by the hydrogen filling device 1, 1-1, 1-2 to each vehicle S, S-1, S-2. Other constructions and action effects in the second embodiment shown in FIG. 6 are the same as those of the first embodiment shown in FIGS. 1 to 5.

Figure 7:
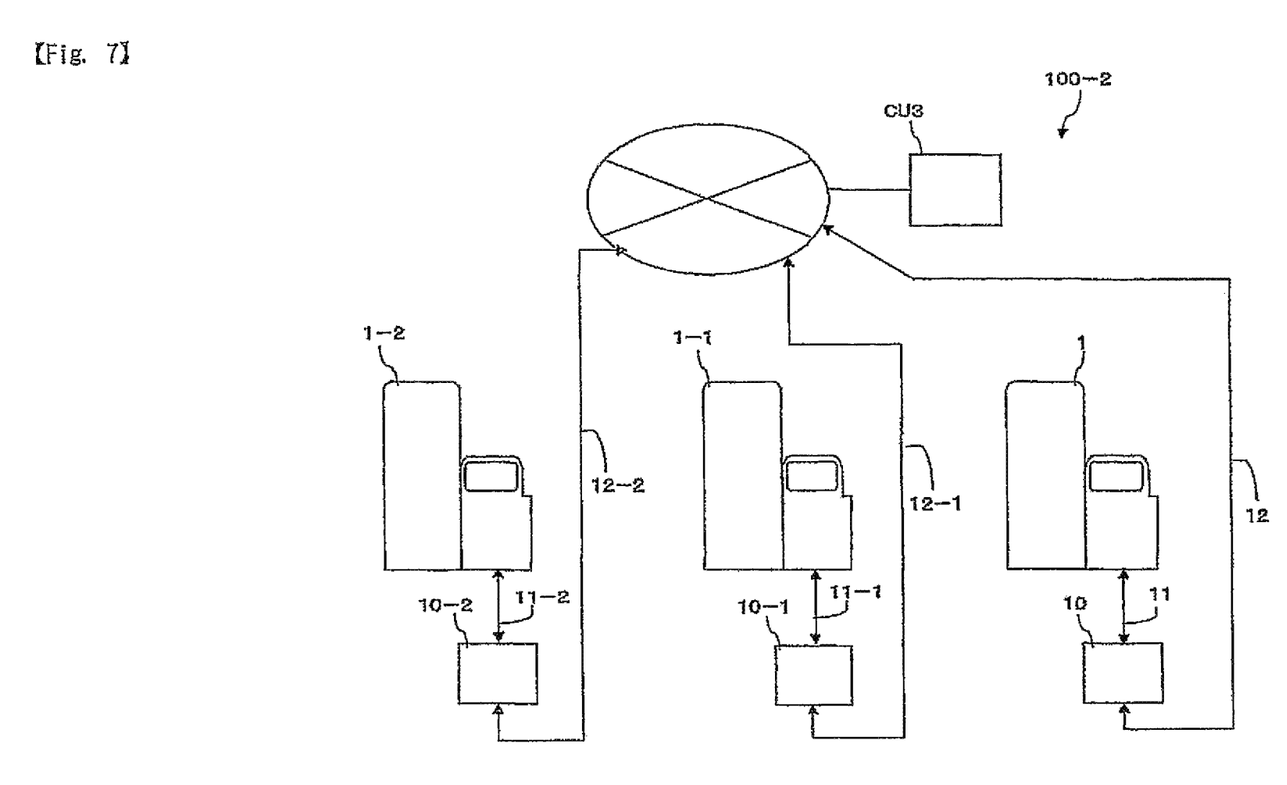
FIG. 7 is an explanation drawing of a hydrogen filling system according to the third embodiment of the preset invention.

In a hydrogen filling system 100-2 according to the third embodiment shown in FIG. 7, a plurality of (three for example) rear equipment are connected to a cloud computer CU3 in bidirectionally communicable way through internets or other information communication networks 12, 12-1, 12-2. Then, the cloud computer CU3 has the same functions as those of the control units CU1, CU2 of the first and second embodiments. Each of the rear equipment 10, 10-1, 10-2, which is connected to the cloud computer CU3, of each hydrogen filling equipment is connected to plurality of or each hydrogen filling device in bidirectionally communicable way through signal transmitting systems 11, 11-1, 11-2. Then, each hydrogen filling device 1, 1-1, 1-2 is connectable to an in-vehicle tank of a vehicle not shown to which hydrogen is filled. In FIG. 7, each of the rear equipment 10, 10-1, 10-2 of each hydrogen filling facility has a single hydrogen filling device 1, 1-1, 1-2.

Information on pressure, temperature and others of an in-vehicle tank of a vehicle not shown connected to the hydrogen filling device 1, 1-1, 1-2 of each hydrogen filling facility is sent to the cloud computer CU3 through the hydrogen filling devices 1, 1-1, 1-2 and the rear equipments 10, 10-1, 10-2, and control signals from the cloud computer CU3 are sent to the hydrogen filling devices 1, 1-1, 1-2 through the rear equipments 10, 10-1, 10-2. With this, communication filling can be done from the hydrogen filling devices 1, 1-1, 1-2 to vehicles. In this connection, although illustration is omitted in FIG. 7, the cloud computer CU3 can be connected not only to the rear equipments 10, 10-1, 10-2, but also to the hydrogen filling devices 1, 1-1, 1-2 in bidirectionally communicable way. Other constructions and action effects of the third embodiment shown in FIG. 7 are the same as those of the first embodiment shown in FIGS. 1 to 5 and the second embodiment shown in FIG. 6.

The embodiments shown in the drawings are mere examples, and technical scope of the present invention in not limited to those.

What is claimed is:

1. A hydrogen filling system comprising:
   a filling nozzle configured to be fluidly connectable to an in-vehicle tank for filling the in-vehicle tank with hydrogen via the filling nozzle;
   a communication system, at least a portion of which is disposed on the filling nozzle, and is configured to receive operational data related to at least one of pressure and temperature of the in-vehicle tank; and
   a control unit for controlling hydrogen filling, the control unit being spaced from the filling nozzle and in operative communication with the communication system to receive the operational data therefrom;
   wherein said control unit is configured to judge whether or not there is an abnormality in pressure or temperature based on the received operational data at communication filling and continue communication filling despite there being an abnormality in the pressure or temperature based on the received operational data over a period of time less than a predetermined time interval, and stopping the communication filling and converting to non-communication filling when there is an abnormality in the pressure or the temperature based on the received operational data over the predetermined time interval.

2. The hydrogen filling system as claimed in claim 1, wherein said control unit has a function of comparing the pressure or temperature data with precedent pressure or temperature data and judging as normal when increased amount of the pressure data or the temperature data is within a predetermined value, and as abnormal when the increased amount of the pressure data or the temperature data is larger than the predetermined value or zero or negative.

3. The hydrogen filling system as claimed in claim 2, wherein said control unit has functions of judging whether or not, before starting the communication filling, communication for transmitting data on the pressure and the temperature in the in-vehicle tank to a filling device is established, and selecting the communication filling when the communication is established and selecting the non-communication filling when the communication is not established.

4. The hydrogen filling system as claimed in claim 1, wherein said control unit has functions of judging whether or not, before starting the communication filling, communication for transmitting data on the pressure and the temperature in the in-vehicle tank to a filling device is established, and selecting the communication filling when the communication is established and selecting the non-communication filling when the communication is not established.

5. The hydrogen filling station as claimed in claim 4, wherein the judging whether or not communication for transmitting data is established occurs over a first time interval different from a second time interval associated with judging whether there is an abnormality in pressure or temperature data.

6. The hydrogen filling system as claimed in claim 1, wherein the communication system includes a receiver located on the filling nozzle and a signal transmitting system in operative communication with the receiver.

7. The hydrogen filling system as claimed in claim 1, further comprising a hydrogen filling device connected to the filling nozzle, the control unit being mounted on the hydrogen filling device.

8. The hydrogen filling system as claimed in claim 1, further comprising a hydrogen filling device connected to the filling nozzle, the control unit being spaced from the hydrogen filling device.

9. The hydrogen filling system as claimed in claim 1, wherein the control unit is capable of communicating with a plurality of communication systems.

10. A hydrogen filling method comprising:
receiving operational data related to at least one of pressure and temperature of an in-vehicle tank at a communication system, at least a portion of the communication system being disposed on a filling nozzle connectable to the in-vehicle tank;
controlling hydrogen filling through the filling nozzle via a control unit spaced from the filling nozzle and in operative communication with the communication system to receive operational data therefrom;
judging whether or not there is an abnormality in pressure or temperature data of the received operational data at communication filling based on the received operational data over a predetermined interval;
proceeding with communication filling despite there being an abnormality in the pressure or temperature based on the received operational data over a period of time less than the predetermined interval; and
stopping communication filling and converting to non-communication filling when there is an abnormality in the pressure or the temperature data occurring over the predetermined interval.

11. The hydrogen filling method as claimed in claim 10, wherein in said judging process the pressure or temperature data is compared with precedent pressure or temperature data and it is judged as normal when increased amount of the pressure data or the temperature data is within a predetermined value, and as abnormal when the increased amount of the pressure data or the temperature data is larger than the predetermined value or zero or negative.

12. The hydrogen filling method as claimed in claim 11 further comprising a process for judging whether or not, before starting the communication filling, communication for transmitting data on the pressure and the temperature in the in-vehicle tank to a filling device is established, and a process for selecting the communication filling when the communication is established and selecting the non-communication filling when the communication is not established.

13. The hydrogen filling method as claimed in claim 10 further comprising a process for judging whether or not, before starting the communication filling, communication for transmitting data on the pressure and the temperature in the in-vehicle tank to a filling device is established, and a process for selecting the communication filling when the communication is established and selecting the non-communication filling when the communication is not established.

* * * * *